Patented Aug. 19, 1924.

1,505,206

UNITED STATES PATENT OFFICE.

HUGH KNIGHT, OF RIVERSIDE, CALIFORNIA.

PLASTIC COMPOSITION AND METHOD OF PREPARING SAME.

No Drawing. Application filed December 10, 1921. Serial No. 521,355.

*To all whom it may concern:*

Be it known that I, HUGH KNIGHT, a citizen of the United States, residing at Riverside, county of Riverside, and State of California, have invented a certain new and useful Plastic Composition and Method of Preparing Same, of which the following is a specification.

My invention relates to a plastic composition and method of preparing same, for manufacturing therefrom, pipes, water and electric conduits, building units and the like, or for use as a preservative coating or lining, an object of the invention being to provide an economical and strong composition which is non-porous and non-absorptive, will resist the action of acids, alkalies, fumes, is non-conductive, and in general will not be subject to decomposition nor affected by atmospheric conditions.

I have discovered that a hydrocarbon material in combination with chemical elements or oxides and earthy matters will, under certain conditions hereinafter specified, yield a product of great tensile strength and one that will increase in hardness with time.

In preparing the composition, a hydrocarbon is used, specifically asphaltum, pitch, natural bitumen or any other product of the hydrocarbon group that may be adapted to the purpose. The softness and hardness of this material is directly proportionate to the hydrogen contained in it and since hardness of varying degrees, without brittleness, of the hydrocarbon residuum is desired and necessary for the product herein aimed at, the removal or liberation of the hydrogen content, or so much of it as may be required for the specific product and hardness thereof, is essential. This I accomplish by mixing with or adding to the hydrocarbon, an element, compound or agent that will produce or result in a volatile substance, as a gas or other fluid, and the elements, compounds or agents so admixed may act as a catalyst or enter into chemical combination with one or more of the hydrocarbon constituents under influences that will effect or result in a reaction, and which volatile substance may or may not disappear from the composition. The compounds or agents which I may use include any of the oxides or combinations of them, which under the proper conditions of temperature, will react or combine with the hydrogen, or part of the same, in the hydrocarbon, to form a volatile or easily separable compound, and which oxides may constitute an essential part of the composition.

Of the non-metallic elements that may be used herein, sulphur is one. In the preparation of the compound, a residual hydrocarbon is heated to melting point and the sulphur then added. The temperature is thereupon increased to approximately 204° C. to cause the sulphur to react or combine with the hydrogen of the hydrocarbon. The combination of these elements produces the volatile hydrogen sulphide, which passes from the mixture. The subsequent cooling of the resultant product, which has been deprived of the element which gives to the residuum its fluid quality, yields an extremely hard material. Generally stated, the proportion of the sulphur added is as 1 to 100, or one per cent, but this proportion may vary according to the hardness desired. To the melted hydrocarbon material, is now added a suitable metallic oxide, as iron, lead, manganese, preferably in the proportion of 1%, additionally to harden the mass. Earthy substances, as aluminum silicate, talc, calcium carbonate and silica, in the form of fine sand, are then added to the mixture, which is kept constantly agitated and at approximately the temperature noted above. These earthy substances are previously heated to about 100° C. before admixing them with the melted residual hydrocarbon, and may consist of approximately the following proportions: 10% aluminum silicate; 6% talc; 2% calcium carbonate; and 60% silica.

Since all oxides will unite and react with hydrogen under certain conditions, and produce a volatile compound that may be readily removed or will automatically disappear from the composition during the subjection thereof to heat, any one or more of the metallic oxides may be used for the purpose of reducing the hydrogen content of the hydrocarbon, or entirely removing it, as conditions require. Such oxides may include alumina, copper, iron, lead or any other, that under the proper conditions will react with hydrogen to produce a volatile compound. Such oxides may then constitute the ingredients required for the mass in addition to the base material, the hydrocarbon. They may act to bring about a reaction, or react themselves with the hydrogen in the hydrocarbon. Where the metallic oxides are used, without the non-metallic ones, the hydrocarbon is first heated to melting point, and then the oxides, previously heated to a temperature of about 100° C. are added. Thereupon the entire mass is subjected to a temperature of from 300° to 350° C., for a sufficient period of time to bring about a union of all of the ingredients and also to cause a further reaction of the oxides with the hydrogen of the hydrocarbon. The period required ranges from forty-five to sixty minutes.

Obviously a combination of the non-metallic oxides and metallic oxides with the hydrocarbon material will yield a product equally as hard and as useful, where the same conditions of compounding the same in accordance with the precepts above detailed are observed. Thus where sulphur or nitrogen is used for a primal liberation of the hydrogen content or the greater part of the same, a metallic oxide or oxides may be used to complete the dehydrogenation of the hydrocarbon under increased temperature, while they themselves form essential ingredients of the composition.

After the material has been treated and mixed as above specified, the composition is ready for molds or application. I have discovered that the association of the ingredients by and in the manner stated, yields a product of great tensile strength, tending to become harder with age and remaining unaffected by any condition, except very high heat and solvents of the hydrocarbon group.

What I claim, is:

1. The process of making a plastic composition which consists in heating a residual hydrocarbon to melting point, adding thereto metallic oxides previously heated to 100° C., then adding earthy substances previously heated to about 100° C, agitating the mass continually and finally subjecting the entire mass to a temperature of from 300° C. to 350° C. to bring about a reaction of the oxides with the hydrogen of the hydrocarbon.

2. The process of making a plastic composition which consists in heating a hydrocarbon residuum to melting point, adding a substance that will react with the hydrogen of the hydrocarbon, then adding thereto aluminum silicate, metallic oxides, calcium carbonate, silica and talc, all previously heated to about 100° C., agitating the mass and finally increasing the temperature to from 300° C. to 350° C. to effect a further reaction of the oxides with the hydrogen of the hydrocarbon.

3. A plastic composition consisting of a de-hydrogenated hydrocarbon and aluminum silicate 10%, talc 6%, calcium carbonate 2%, and silica 60%.

In testimony whereof I have set my hand.

HUGH KNIGHT.